United States Patent [19]
Wiebe

[11] 3,824,438
[45] July 16, 1974

[54] DITHER CIRCUIT

[75] Inventor: Harold Dean Wiebe, Sharonville, Ohio

[73] Assignee: Cincinnati Milacron Inc., Cincinnati, Ohio

[22] Filed: June 13, 1973

[21] Appl. No.: 369,486

[52] U.S. Cl. ............................................. 318/631
[51] Int. Cl. ........................................... G05b 23/02
[58] Field of Search ................................... 318/631

[56] References Cited
UNITED STATES PATENTS

| | | | |
|---|---|---|---|
| 3,110,851 | 11/1963 | Plogstedt | 318/631 |
| 3,179,865 | 4/1965 | Carton | 318/631 |
| 3,241,016 | 3/1966 | Wattson | 318/631 |
| 3,450,970 | 6/1969 | Younkin | 318/631 X |
| 3,465,218 | 9/1969 | Younkin | 318/631 X |

Primary Examiner—B. Dobeck

[57] ABSTRACT

An apparatus for use with a servomechanism having a transducer coupled to a movable element and producing a quantized feedback signal. The apparatus provides a dither signal on an output of the feedback element at a frequency which keeps the servomechanism from changing the position of the element from a desired position.

4 Claims, 3 Drawing Figures

DITHER CIRCUIT

BACKGROUND OF THE INVENTION

The invention relates generally to servomechanism controls; and specifically, the invention provides apparatus for use with a relatively low cost system having a feedback device which provides a quantized representation of the feedback signal.

There is an inherent problem of oscillation about a desired position or null in any servomechanism operating with a quantized error signal. The oscillation or limit cycle is caused by the fact that different elements in the servomechanism loop have different response times. The magnitude of the limit cycle is a function of the degree of mismatch in the response times of said elements. If there was no time lag between the motion of an output device and the occurrence of an input signal, the system would not limit cycle, but such conditions do not exist in the real world. The servomechanism may drift, and the drive element will cause a correction. However, the correction may be too much. Thus, an error is created in the other direction, and the servomechanism will drive back in the other direction. Again, it will not drive exactly to position; and the process continuously repeats itself. Consequently, the system will oscillate or hunt the desired position. The degree of limit cycle will vary from system to system as a function of the quality of the components contained therein.

Historically, to solve this problem several techniques were used. A designer might reduce the gain of the system around null. This has many undesirable characteristics. A braking device or other damping means may be provided with the servo motor; however, this is expensive and not desirable.

Most typically, a designer would make the accuracy of the servomechanism, i.e., its ability to hold a load in a position, greater than the resolution, i.e., the smallest increment of input to which servomechanism will respond. For example, a control system may be designed to move a member in response to command signals representing 0.0005 inches; but once in position, the control has the ability to maintain that position to within ± 0.00005 inches. To obtain an accuracy which is much greater than the desired resolution of the system, complex and expensive feedback devices and circuits are required. All of this is necessary because a servomechanism with a quantized error signal will limit cycle about a desired position.

Applicant's invention solves the above problems and permits one to design a servomechanism having a quantized feedback signal in which the accuracy more closely corresponds to the desired resolution; consequently, a simpler and lower cost system is available.

SUMMARY OF THE INVENTION

According to one embodiment of the invention applicant provides an apparatus for use in a servomechanism having a feedback element connected to a movable element and producing a quantized feedback signal. Said feedback signal causes the servomechanism to limit cycle the element about a desired position. However, the improvement provides means for producing a dither signal having a phase component being cyclic in nature and having a frequency substantially greater than the limit cycle frequency of the element. Means are further provided for combining the feedback signal and the dither signal to roduce a new feedback signal causing the servomechanism to limit cycle at a frequency approximately equal to the frequency of the dither signal thereby eliminating the limit cycle of the movable element.

DESCRIPTION OF THE PREFERRED EMBODIMENT

Figure 1:
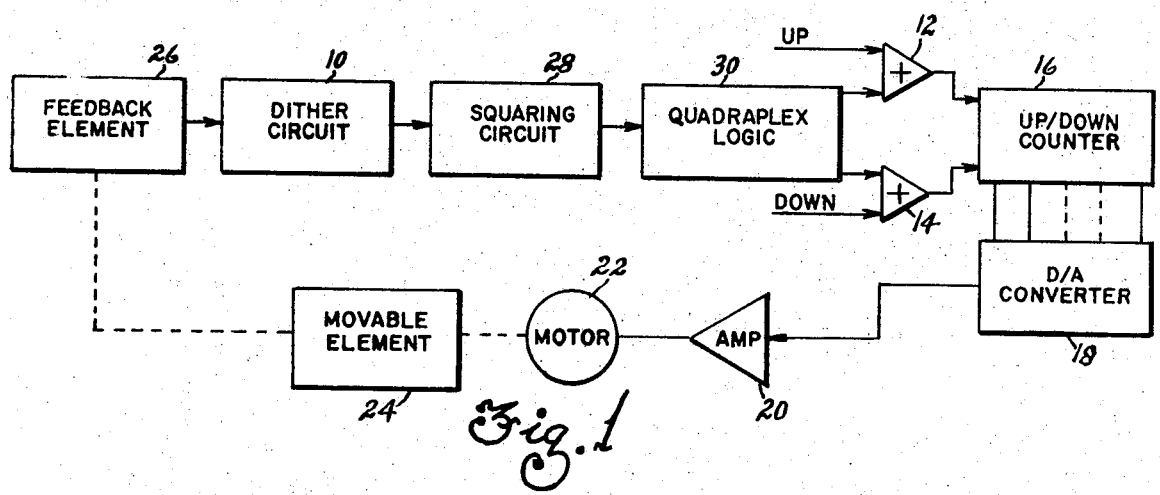
FIG. 1 is a detailed block diagram of a typical servomechanism utilizing the invention.

FIG. 1 illustrates a detailed block diagram of a typical servomechanism circuit employing the invention. Without the dither circuit 10, the circuit illustrated operates by applying command pulses to the appropriate one of the gates 12 or 14, depending on the desired direction of motion. These pulses are passed to an up/-down counter 16 which produces output signals to a digital to analog converter 18. The converter 18 generates an analog signal to a motor amplifier 20 which drives a motor 22. The motor 22 is mechanically connected to a movable element 24 and is operative to move said element toward the position defined by the command pulses. A feedback element 26 is responsive to the motion of the element 24 and produces quantized feedback signals indicative of said motion. Typically, the feedback element will generate two signals which are displaced in phase in order that the direction of motion can be detected. In the absence of the dither circuit 10, the feedback signals are input to a squaring circuit 28 which has outputs connected to a quadraplexing circuit 30. The purpose of the quadraplexing circuit 30 is to detect the direction of motion and supply the feedback pulses to the appropriate one of the gates 12 or 14.

When the element 24 is moved a distance corresponding to the distance represented by the command pulses, the counter 16 should be in its initial state; and the analog signal from the converter 18 will be zero. When the system is at rest, the components will tend to drift; and the feeback element will eventually produce a signal output signal. The motor will respond to this and may overshoot thus causing the feedback element to produce an error in the opposite direction. This process repeats itself, and the servomechanism will cause the element to limit cycle about the desired position. As discussed earlier, the hunting problem was typically solved by increasing the accuracy of the servomechanism loop. In other words, the incremental resolution of the servomechanism was substantially smaller than the incremental resolution of the command pulses. The servomechanism would still limit cycle, but the magnitude of the limit cycle is so small that the movable element would remain at the desired position. It should be noted that the circuit of FIG. 1 is only shown as a typical servomechanism. The invention is applicable to any servomechanism in which a feedback element is used that quantizes the feedback signals.

The addition of the dither circuit 10 to the circuit of FIG. 1 permits the reduction of accuracy in the servomechanism to a magnitude approximately equal to the resolution of the command pulses. This substantially reduces the cost of the servomechanism without any loss of performance.

Figure 2:
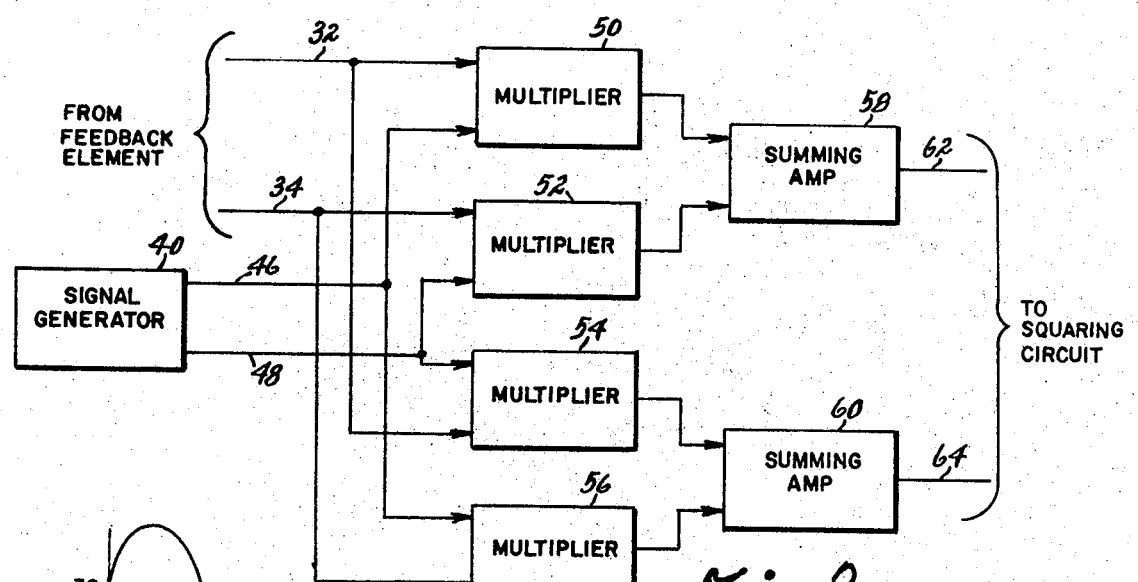
FIG. 2 is a detailed block diagram of the dither circuit illustrated in FIG. 1 and comprising a signal generator and a dither generator.
Figure 3:
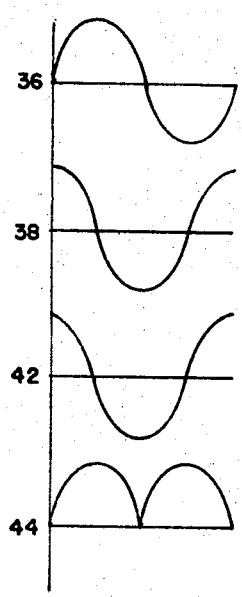
FIG. 3 illustrates the wave shapes of several signals used in the apparatus.

FIG. 2 is a detailed block diagram of the dither circuit 10. Lines 32 and 34 represent the feedback signals from the feedback element 26. The feedback signals may be saturated sine waves; however, by means of a simple adjustment to the feedback element, e.g., if the element is an encoder, the lamp voltage may be reduced, the feedback signals can be adjusted to represent normal sine and consine functions as represented in curves 36 and 38 of FIG. 3. By superimposing a dither signal on a feedback signals, they will limit cycle at a frequency beyond which the motor is capable of responding; therefore, the movable element will not change position. To accomplish this, a dither signal having a phase component varying cyclically in time is added to the feedback signals.

Let $\theta$ represent a position angle relating to the desired position of the feedback element and let $\phi$ represent a dither or reference angle which modifies the position angle. Let T represent the period of variation of $\phi$, e.g., 180°, and let $\theta'$ equal the position angle $\theta$ plus the reference angle $\phi$. The derivation of a dithered feedback signal is shown below:

$$\theta' = \theta + \phi, \; 0 < t < T/2$$

$$\theta' = \theta - \phi, \; T/2 \; t \; T$$

From $0 < t < T/2$
1. $\sin \theta' = \sin (\theta + \phi) = \sin \theta \cos \phi + \cos \theta \sin \phi$
2. $\cos \theta' = \cos (\theta + \phi) = \sin \theta \sin \phi + \cos \theta \cos \phi$ From $T/2 < t < T$
3. $\sin \theta' = \sin (\theta - \phi) = \sin \theta \cos \phi - \cos \theta \sin \phi$
4. $\cos \theta' = \cos (\theta - \phi) = -\sin \theta \sin \phi + \cos \theta \cos \phi$ The above outputs represented by Equations 1 through 4 are generated electrically to simulate the effects of a mechanical dither. A signal generator 40 generates reference signals on lines 46 and 48 comprised of a cosine signal and a sine signal as indicated in the curves 42 and 44 respectively of FIG. 3. The reference signals are multiplied by the feedback signals in commercial multiplier circuits 50, 52, 54 and 56. The outputs of the multipliers are summed in analog summing amplifiers 58 and 60. The multipliers and amplifiers comprising a dither generator produce new feedback signals on lines 62 and 64 which are inputs to the squaring circuits 28 shown in FIG. 1.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for use with a servomechanism of the type having a feedback element connected to a movable element and producing a quantized feedback signal, said feedback signal causing the servomechanism to limit cycle the movable element about a desired position, wherein the improvement comprises:
    a. means for producing a dither signal having a phase component thereof cyclically changing the time and having a frequency substantially greater than the limit cycle frequency of the element; and
    b. means responsive to the dither signal and the feedback signals for generating a new feedback signal, said new feedback signal causing the servomechanism to limit cycle at a frequency approximately equal to the dither frequency thereby eliminating the limit cycle of the movable element.

2. An apparatus for use with a servomechanism of the type having a feedback element connected to a movable element and producing a quantized feedback signal, said feedback signal causing the servomechanism to limit cycle the movable element about a desired position, wherein the improvement comprises:
    a. means for producing reference signals representing trigonometric functions, each of said reference signals having a phase component oscillating between two predetermined angular values and said phase oscillation occurring at a frequency substantially greater than the limit cycle frequency of the movable element; and
    b. means responsive to the feedback signal and the reference signals for superimposing the reference signal on the feedback signal to cause the servomechanism to limit cycle at a frequency approximately equal to the reference signal frequency thereby eliminating the limit cycle of the movable element.

3. An apparatus for use with a servomechanism of the type having a feedback element connected to a movable element and producing quantized feedback signals, one of said feedback signals representing a sine value of a position angle relating to the position of the feedback element, and the other feedback signal representing a cosine value of the position angle, said feedback signals causing the servomechanism to limit cycle the movable element about a desired position, wherein the improvement comprises:
    a. means for producing a first reference signal representing a cosine value of a reference angle varying between a first two predetermined angular values and a second reference signal representing a sine value of the reference angle varying between a second two predetermined angular values; and
    b. means responsive to the feedback signals and the reference signals for producing a first new feedback signal representing the sine value of the sum of the position angle and the reference angle and a second new feedback signal representing the cosine value of the sum of the position angle and the reference angle, said signals causing the servomechanism to limit cycle without changing the position of the movable element.

4. An apparatus for use with a servomechanism of the type having a feedback element connected to a movable element and producing two quantized feedback signals, a first feedback signal representing a sine value of a position angle relating to the position of the feedback element and a second feedback signal representing a cosine value of the position angle, said feedback signals causing the servomechanism to limit cycle the movable element about a desired position, wherein the improvement comprises:
    a. means for producing a first reference signal representing a cosine value of a reference angle varying between a first two predetermined angular values and a second reference signal representing a sine value of a reference angle varying between a second two predetermined angular values;

b. a first multiplier responsive to the first feedback signal and the first reference signal for multiplying said signals to produce a first output signal;
c. a second multiplier responsive to the second feedback signal and the second reference signal for multiplying said signals to produce a second output signal;
d. a summing amplifier responsive to the first and second output signals for summing said signals to produce a first new feedback signal;
e. a third multiplier responsive to the second reference signal and the first feedback signal for multiplying said signals to produce a third output signal;
f. a fourth multiplier responsive to the first reference signal and the second feedback signal for multiplying said signals to produce a fourth output signal; and
g. a summing amplifier responsive to the third and fourth output signals for summing said signals to produce a second new feedback signal.

* * * * *